M & S. Shawver
Harvester Rake.
Nº 35397. Patented May 27, 1862.
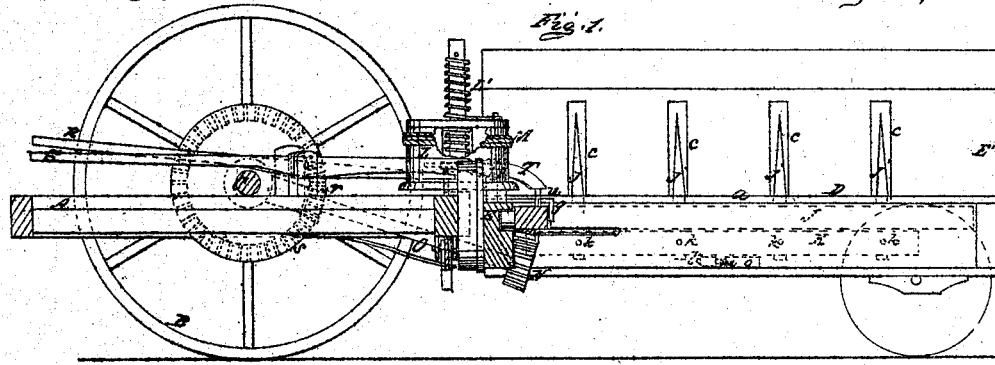
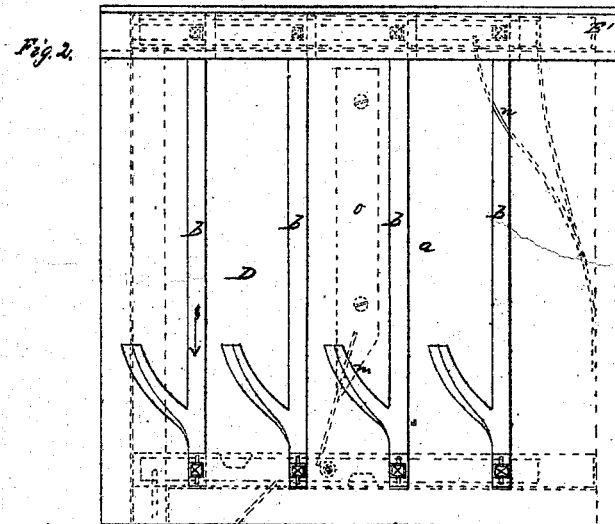
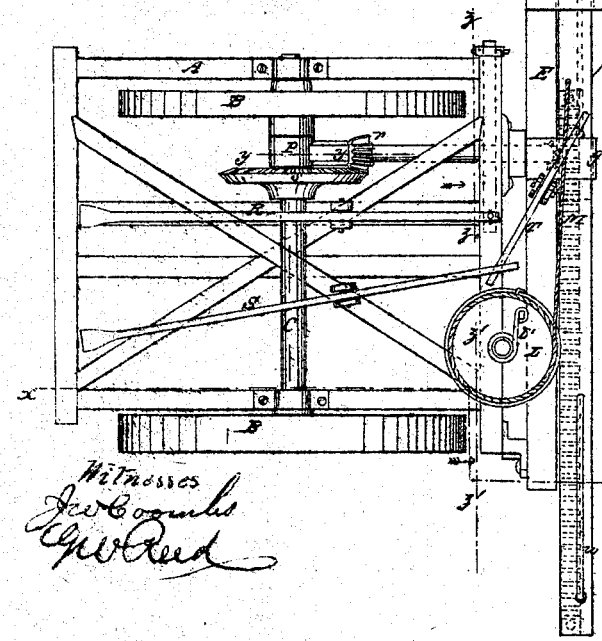
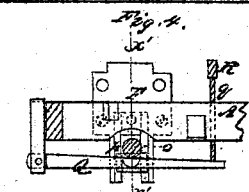
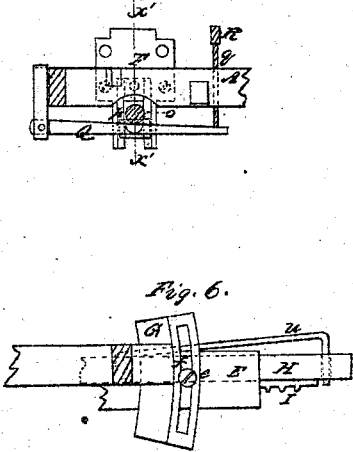
Witnesses
Inventor
M. Shawver, S. Shawver
per Munn & Co. attorneys

UNITED STATES PATENT OFFICE.

M. SHAWVER AND S. SHAWVER, OF BELLEFONTAINE, OHIO.

IMPROVEMENT IN HARVESTERS.

Specification forming part of Letters Patent No. 35,397, dated May 27, 1862.

*To all whom it may concern:*

Be it known that we, M. SHAWVER and S. SHAWVER, both of Bellefontaine, in the county of Logan and State of Ohio, have invented a new and Improved Raking Device for Harvesters; and we do hereby declare that the following is a full, clear, and exact description of the same, reference being had to the accompanying drawings, making a part of this specification, in which—

Figure 1 is a side sectional view of a harvester with our improvement applied to it, $x$ $x$, Fig 2, indicating the plane of section. Fig. 2 is a plan or top view of the same. Fig. 3 is a section of a portion of the same, taken in the line $y$ $y$, Fig. 2. Fig. 4 is a section of a portion of the same, taken in the line $z$ $z$, Fig. 2. Fig. 5 is a section of a portion of Fig. 4, taken in the line $x'$ $x'$. Fig. 6 is a section of a portion of Fig. 2, taken in the line $z'$ $z'$.

Similar letters of reference indicate corresponding parts in the several figures.

This invention relates to an improved raking device for harvesters of that class which are provided with adjustable rake-teeth, and which work in slots in the platform of the harvester.

The object of the invention is to obtain a raking device of the class specified which may be operated at the will of the driver or attendant, and also be capable of being adjusted so that the sickle, which is attached, as usual, to the platform, may be made to cut higher or lower, as desired.

To enable others skilled in the art to fully understand and construct our invention, we will proceed to describe it.

A represents the main frame of a harvester, which is supported by two wheels, B B, one of which is placed loosely on the axle C and the other attached permanently to it.

D represents the platform of the harvester, which is of rectangular form, and connected to the back part of the main frame A by a bar, E. The platform D is a box, the top $a$ of which receives the cut grain, the sickle being at the front end of the box, and not represented, as it may be of the ordinary reciprocating kind and driven in the usual manner. The top $a$ of the box is slotted longitudinally at equal distances apart, as shown at $b$ in Fig. 2, and at the outer end of said box there is an upright chamber, E, which extends the whole width of the platform, as shown in Figs. 1 and 2. The inner side of the chamber E has vertical slots $c$ made in it, which are in line with the slots $b$ of the top of the box or platform D. The slots $c$ are shown in Fig. 1.

The bar E is connected to the back of the main frame A by a pivot, $d$, which passes into a metal plate, F, secured to the main frame, and the outer end of said bar E is connected to a segment-plate, G, at the back of the main frame by means of a screw, $e$, which passes through a curved slot, $f$, in said plate, as shown clearly in Fig. 6. By this arrangement it will be seen that the box or platform D may be adjusted higher or lower, as desired, by simply unscrewing the screw $e$ and securing the outer end of the bar E higher or lower to the segment-plate G, the bar E working on the pivot $d$ as a center.

H is a bar which is fitted to the outer or back side of the bar E, and is connected thereto by a guide, $g$, the outer part of bar H being supported by a roller, $h$, which is fitted in a longitudinal groove, $i$, in bar E. (See Fig. 5.)

To the under side of the bar H there is attached a rack, I, and the inner end of the bar E—that is to say, the right-hand end—works within the box D, and has a rake-head, J, attached to it at right angles. The rake-head J extends the whole width of the box D, and it is provided with teeth $j$, at equal distances apart, the teeth passing through the slots of the rake-head. Underneath the rake-head there is placed a slide, K, to which the teeth $j$ are attached by pivots $k$. This slide K has a pin or friction-roller, $l$, secured to its under surface.

On the bottom of the box D there is a spring, $m$, and a spring, $n$, is also placed within the box and attached to its back end or side, as shown in Fig. 2. The spring $m$ is secured to the end of a bar, $o$, attached longitudinally to the bottom of box D, and parallel with its front and back sides.

On the back part of the main frame A there is placed a drum, L, which has a spiral spring, L', connected to it, and M is a cord attached to drum L and to the bar H. The spring of the drum L has a tendency to wind the cord upon the latter and draw the rake-head in the direction indicated by arrow 1 in Fig. 2.

N is a pinion, which is placed on the end of a shaft, O, the front end of which has its bearing in a collar, P, placed loosely on the axle C of the wheels. The shaft O has its outer bearing in a slide, p, which is fitted in the lower part of the plate F, (see Figs. 4 and 5,) and underneath the outer part of said shaft O there is a lever, Q, having a cord, q, attached to it, which passes up through the back part of the main frame and is connected to a treadle, R. (See Figs. 2 and 4.) The shaft O is rotated by gears r s from the axle C, and the pinion N on the back end of shaft O gears into the rack I of bar H when the back end of shaft O is raised.

On the outer part of bar H there is placed a spring-stop, u, the use of which will be presently shown, and on the main frame A there is a treadle, S, to the back end of which there is connected a lever, T.

The operation is as follows: As the machine is drawn along, the cut grain falls on the platform or upper surface of the box D, and the rake-head J is at the right-hand end of the box D, within the chamber E, and is retained therein by the spring-stop u, which bears against the guide g, as shown in red in Fig. 2. When the rake-head J is within the chamber E, the teeth j are in a vertical position and in line with the slots c, as shown in Fig. 1, the teeth being retained in that position under the action of the spring n on the slide K. At any time when it is desired to rake the cut grain from the platform the driver or attendant presses down the front end of treadle S, and thereby causes the lever T to force down the spring-stop u, free from the guide g, and allow the drum L, under the action of its spring, to draw the rake toward the discharge end of the platform or box D, as indicated by arrow 1. When the grain is discharged from the platform or box D, the driver or attendant depresses the treadle R, and thereby actuates the lever Q, which raises the back part of shaft O and causes its pinion N to engage with rack I, and as the shaft O is rotated from the axle C, through the medium of the gearing r s, the pinion N and rack I will throw the rake-head back to its original position in the chamber E, the spring m actuating the slide K and causing the teeth j of the rake to pass down into the box D, the spring n raising the teeth as the rake-head passes into chamber E.

This arrangement of the rake-head, slotted platform, and adjustable teeth is not new, the same having been used and arranged precisely as herein shown and described; but we are not aware that an arrangement of means as herein shown and described has ever been used for operating the rake at the will of the driver or attendant. We therefore do not claim the reciprocating rake-head provided with rising and falling teeth and a slotted platform; but We do claim as new and desire to secure by Letters Patent—

1. The drum L, provided with a spiral spring, L', and connected to the bar H, which is provided with a spring-stop, u, and rack I, in connection with the adjustable shaft O, provided with the pinion N, and operated as shown, and the treadles R S, arranged for actuating, respectively, the shaft O and spring-stop u, substantially as and for the purpose set forth.

2. The manner of securing the bar E to the main frame A, as shown and described—to wit, by means of the pivot d, slotted plate F, and set-screw e, whereby the platform, and consequently the sickle, may be readily adjusted higher or lower, as desired.

M. SHAWVER.
SOLU SHAWVER.

Witnesses:
J. N. ALLEN,
JOHN SHURR.